Figure 1:
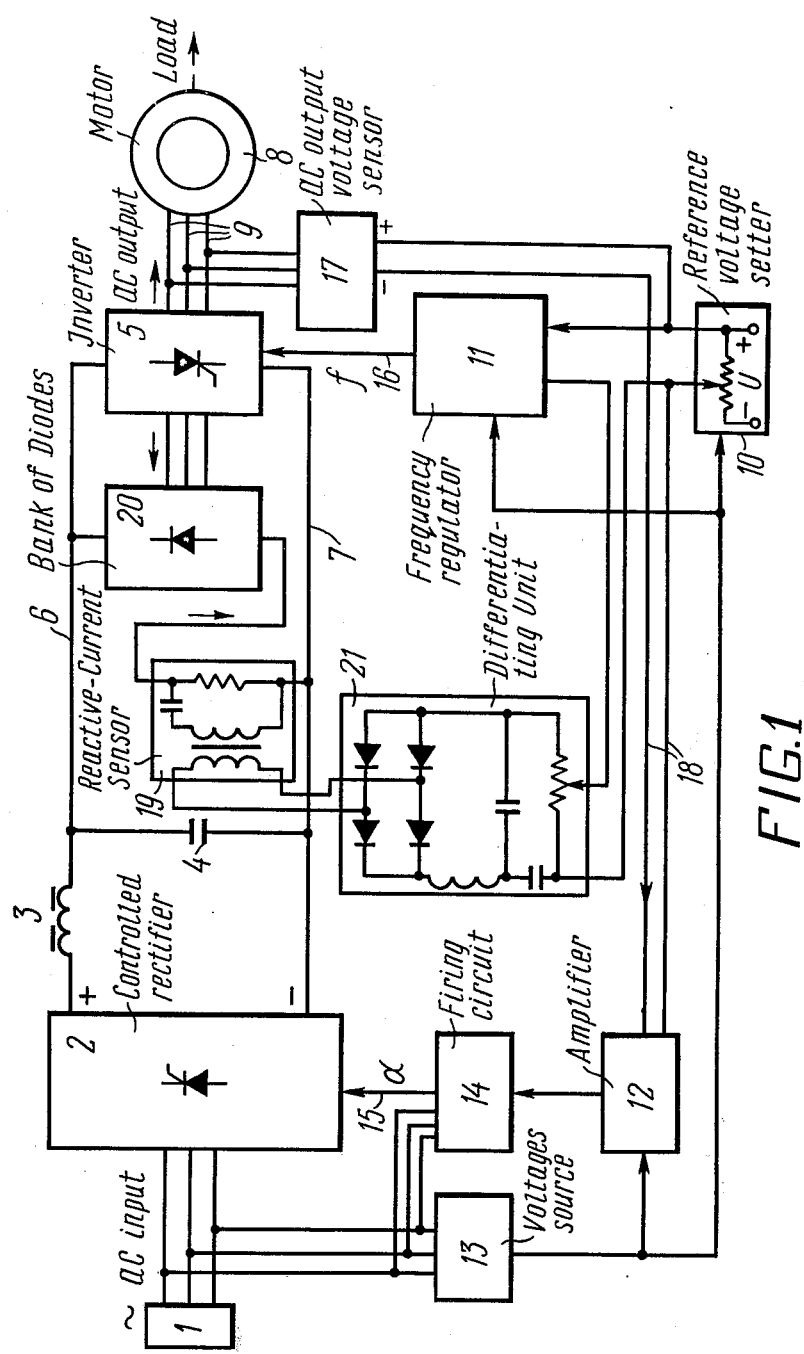

United States Patent
Yatsuk et al.

[11] 3,935,518
[45] Jan. 27, 1976

[54] METHOD OF ELIMINATING SELF OSCILLATIONS OF AN INDUCTION MOTOR POWERED FROM A FREQUENCY CHANGER AND MEANS FOR EFFECTING SAME

[76] Inventors: Vladimir Grigorievich Yatsuk, ul. Pervomaiskaya, 8, kv. 57; Vladimir Fedorovich Petrenko, ul. Sovetskaya, 13, korpus 1, kv. 210, both of Istra Moskovskoi oblasti, U.S.S.R.

[22] Filed: Aug. 5, 1974

[21] Appl. No.: 494,910

Related U.S. Application Data

[63] Continuation-in-part of Ser. No. 221,740, Dec. 6, 1972, abandoned.

[52] U.S. Cl. ................. 318/227; 318/230; 318/231
[51] Int. Cl.² .......................................... H02P 5/40
[58] Field of Search .................... 318/227, 230, 231

[56] References Cited
UNITED STATES PATENTS

| | | | |
|---|---|---|---|
| 3,402,336 | 9/1968 | Risberg .............................. | 318/227 |
| 3,546,551 | 12/1970 | Risberg et al. ..................... | 318/227 |
| 3,619,749 | 11/1971 | Schieman ....................... | 318/227 X |

*Primary Examiner*—G. Z. Rubinson
*Attorney, Agent, or Firm*—Haseltine, Lake & Waters

[57] ABSTRACT

A method of eliminating self-oscillations of an induction motor powered from a thyristor frequency changer, differing from those known in the prior art in that it provides for forming a signal proportional to a first derivative of the low frequency component of the motor reactive current oscillations which signal is applied as a positive feedback, in sequence with a main control, signal to an output frequency control circuit of the thyristor frequency changer.

A control system provided comprising a power supply and a power circuit energized by the former to produce an a.c. output voltage whose amplitude and frequency are proportionally regulated, and a control circuit energized by the power supply to control the power circuit. The latter circuit includes a three-phase rectifier bridge and an independent inverter. The control circuit includes respective means for controlling the amplitude and the frequency of the inverter output voltage. The latter means includes a frequency regulator, a controlled reference voltage circuit which determines the output frequency of the inverter under steady-state conditions. The improvement of the invention resides in that a feedback circuit is provided to produce a voltage proportional to the low-frequency component of the reactive current oscillations of the motor the frequency regulator being supplied with the reference voltage plus the feedback voltage, thus providing for control of the inverter output frequency under transient conditions.

4 Claims, 2 Drawing Figures

METHOD OF ELIMINATING SELF OSCILLATIONS OF AN INDUCTION MOTOR POWERED FROM A FREQUENCY CHANGER AND MEANS FOR EFFECTING SAME

This application is a continuation-in-part of the copending application Ser. No. 221,740 filed Dec. 6, 1972, now abandoned.

The present invention relates to the control of an induction motor, and more specifically to a method of eliminating self-oscillations of an induction motor powered from a static frequency changer, and an induction motor control apparatus.

As will be recalled, the lack of two-way coupling between a motor and the supply mains, as well as periodic accumulation of energy in the reactive elements of static frequency chargers in a.c. induction motor electric drivers, powered from static frequency chargers with a rectifier and an independent inverter, gives rise to self-oscillations at a relatively low frequency, consisting in that the current the, voltage and the speed of the induction motor vary periodically.

These self-oscillations may occur under both dynamic and steady-state conditions of electric drive operations and are markedly dependent on the amount of slip of the induction motor, the moment of inertia of the load, and the capacitance of the filter which is always provided at the input of independent inverters.

Known in the art is a control system with frequency regulation, which is provided with a voltage feedback circuit (cf. U.S. Pat. No. 3,546,551 granted to R. L. Risberg on Dec. 8, 1970).

When the output voltage of a rectifier oscillates, an additional signal proportional to said voltage is applied to a frequency control circuit through a coupling RC-circuit C2, 17 to a transistor base T3, which brings about corresponding change of the frequency of a master oscillator.

A disadvantage of such a control system lies in that the output voltage of a rectifier or an inverter is not only determined unambiguously by the operating conditions of a motor but also depends on the LC-filter parameters at the output of the rectifier, which filter is used in all prior-art designs (e.g., choke 83 and capacitor 84 in U.S. Pat. No. 3,344,326; choke 6 and capacitor 8 in U.S. Pat. No. 3,402,336; etc.).

This disadvantage brings about a situation where the voltage at the output of the rectifier (supply lines 4 and 6) for example, affected by a sharp decrease in the load, may substantially rise due to the electromagnetic energy accumulated in the choke 83 being transferred to the filter capacitor 84, which causes undesirable changes in the inverter output frequency.

The frequency level of the additional damping signal is not limited in the device disclosed in Risberg's patent, which is a drawback that may cause considerable departure of the frequency and speed values from the preset stable values under dynamic modes of operation, thus expanding the time of the transient process. Moreover, intensive oscillation of the output frequency produces an adverse effect on the commutating processes in the inverter and the motor.

It is an object of the present invention to eliminate self-oscillations in an induction motor powered from a static frequency changer.

A broader object of this invention is to ensure stable operation of an induction motor over a wide range of output frequency and voltage control.

These objects are achieved through practical realization of a method of eliminating self-oscillations in an induction motor powered from a thyristor frequency changer which is provided with an output voltage control circuit, the invention residing in that an additional correcting signal, proportional to a first derviative of the low-frequency component of the motor reactive current oscillations is formed, which is then applied, as a positive feedback signal, in sequence with a main control signal, to the output frequency control circuit of the thyristor frequency changer, the maximum value of the correcting signal being preferably limited to a level which is proportional to the nominal frequency of the rotor current in the motor.

The proposed method of eliminating self-oscillations differs from those known in the prior-art in that a signal of the induction motor reactive current, which serves as an unambiguous parameter and optimally characterizes the steady-state or transient conditions of operation, is used to eliminate various oscillations occurring in the motor.

Thus, according to the invention, only the low-frequency component of the reactive current, which occurs during self-oscillations, is separated, while the oscillations of the inverter input voltage and the motor active current do not cause changes in the inverter output frequency.

Limiting of the value of the additional correcting signal by a level corresponding to the nominal slip frequency of the motor, and sequential addition thereof to a frequency-setting signal of the inverter are essential features of the proposed method. This prevents the induction motor operating under dynamical conditions from passing over from the stable range of the mechanical characteristic to the unstable one where the motor suffers greater energy losses and the time of the transient process is substantially extended.

The inventive control system uses a power supply and a power circuit energized thereby to produce an a.c. output voltage the amplitude and the frequency whereof are proportionally regulated, and a control circuit which is energized by said power supply to control the power circuit, which includes:

— a controlled d.c. supply circuit incorporated in said power circuit to provide a controlled d.c. voltage;

— an inverter incorporated in the power circuit and energized through an LC-filter by the controlled d.c. voltage to obtain an output voltage to feed an a.c. motor, the output voltage having an amplitude regulated proportionally to the d.c. voltage and the controlled frequency;

— a bank of valve-action elements of the inverter which conduct current from the motor in the opposite direction in order to maintain a voltage across a capacitor of the LC-filter proportional to the counter-electromotive force of the motor;

— means incorporated in the control circuit, including a controlled reference voltage circuit to produce a reference voltage, a first feedback circuit to produce a first feedback voltage proportional to the output voltage of the inverter, and a comparison circuit to obtain a deviation voltage proportional to the difference between the reference voltage and the first feedback voltage;

— means incorporated in the control circuit, sensitive to the deviation voltage, for controlling the d.c. power circuit;

— a frequency controlling means incorporated in the control circuit to control said inverter, which includes:

— said controlled reference voltage circuit to produce a reference voltage determining the output frequency of the inverter under steady-state conditions.

— The improvement according to the invention resides in that a second feedback circuit is provided to produce a second feedback voltage proportional to the low-frequency component of the motor reactive current oscillations;

— a frequency regulator energized by the reference voltage and the second feedback voltage, which produces periodic voltage pulses at a frequency proportional to the sum of those voltages;

— means, sensitive to the voltage pulses, for controlling the inverter.

It is suggested that the second feedback circuit in the control system includes:

— first means for obtaining a voltage proportional to the reactive component of the motor current, which means are energized by the bank of valve-action elements that conduct the motor current in the opposite direction;

— second means for obtaining a voltage proportional to the low-frequency component of the motor reactive current oscillations;

— the first means being supplied to the second means;

— means for differentiating the voltage which is proportional to the low-frequency component of the motor reactive current oscillations.

It is also recommended by the invention that the first means proportional to the reactive component of the motor current includes a resistor inserted between common anodes of the bank of valve-action elements and the negative bus of said d.c. supply circuit, and a capacitor, one of the plates whereof is connected to the common anodes of the bank of valve-action elements, and the other plate is connected in series with the primary winding of a differentiating transformer, the free end of which is connected to the negative bus.

It is further expedient that the second means be arranged as a single-phase full-wave rectification circuit using non-controlled valve-action elements, the input whereof is connected to the secondary winding of the differentiating transformer, and an RC-differentiating circuit, the input whereof is connected through a low-frequency LC-filter to the output of the rectification circuit, and the output of this differentiating circuit is connected in series to the output of the reference voltage circuit, which determines the output frequency of the inverter under steady-state conditions.

The invention will be more fully understood from the following detailed description where for clarity of presentation use is made of a particular specific terminology, although the invention is not limited to the terms used, and it should be borne in mind that each term covers all equivalent elements displaying the same action.

Figure 2:
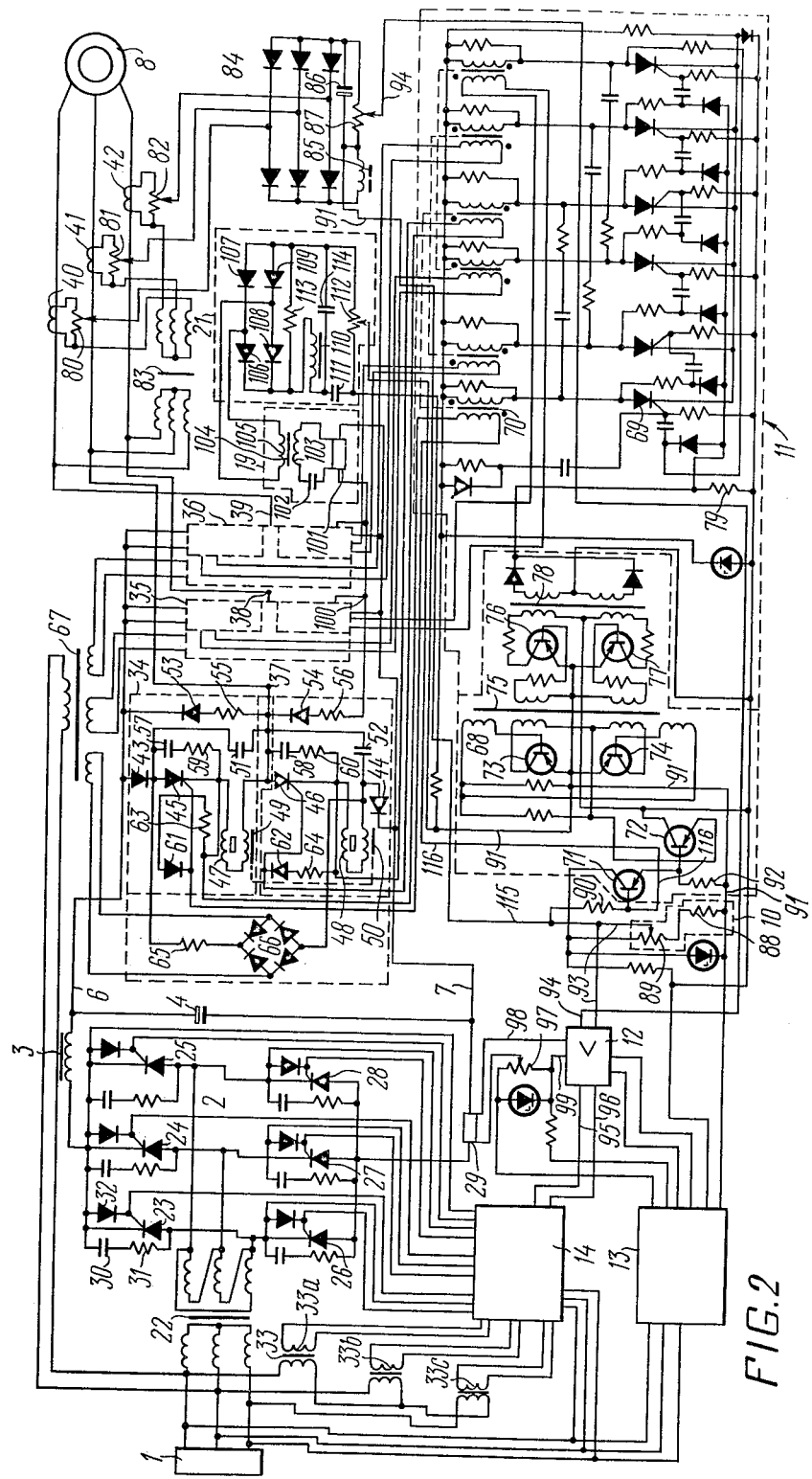

It should also be borne in mind that other objects and advantages of the present invention will be clear from the description below when read in connection with the accompanying drawing, wherein:

FIG. 1 is a block diagram of an induction motor control system, according to the invention and FIG. 2 is a circuit diagram of the control system.

Referring now to the drawings, the control system uses a three-phase power supply 1 which energized a rectifier bridge 2. A one-way output of the bridge 2 energizes an inverter 5 through leads 6 and 7 and an LC-filter made up of a choke 3 and a capacitor 4. A squirrel-cage induction motor 8 is energized by a controlled-frequency voltage from the output of the inverter 5 through leads 9.

The power supply 1 also energizes a control circuit which includes a reference voltage source 10, a frequency regulator 11 and an amplifier 12 through a controlling and rectifying power unit 13.

Further, the power supply 1 feeds a control circuit 14 which controls the valve-action elements of the rectifier bridge 2, as whown by the line 15.

The frequency regulator 11 regulates the output frequency and controls valve-action elements of the inverter 5, as shown by the line 16.

The output frequency of the frequency regulator 11 is regulated under steady-state conditions of operation by the output voltage of the reference voltage source 10.

In order to realize a controlling function, a first voltage feedback circuit 17 is fed by the output voltage from the inverter 5.

The output voltage of the first voltage feedback circuit 17 is compared with the reference voltage from the source 10 and the difference between these two voltages is taken, as shown by the lines 18, to the input of the amplifier 12 which controls the circuit 14.

A second flexible feedback circuit consists of a reactive current sensor 19 which is fed by the current from a bank 20 of valve-action elements of the inverter 5 and a differentiating unit 21 the input of which receives the voltage from the sensor 19, and the output voltage of the unit 21 is sequentially added to the reference voltage of the source 10, and the sum of these voltages is taken to the input of the frequency regulator 11, thus determining its output frequency under transient conditions.

The control system shown in outline in FIG. 1 is represented in greater detail in FIG. 2.

FIG. 2 shows that the a.c. three-phase power supply 1 energizes, through a matching transformer 22, a rectifier bridge arranged as a three-phase bridge with thyristors 23, 24, 25, 26, 27, 28.

The cathodes of the thyristors 23, 24, 25 are connected to one other and to the anodes of the thyristors 26, 27, 28 via a series circuit including the filter choke 3, filter capacitor 4 and a resistor 29. A series circuit including a capacitor 30 and a resistor 31 is connected between the anode and the cathode of the thyristor 23. Similar RC-circuits are connected between the anodes and cathodes of the thyristors 24, 25, 26, 27, 28 in order to lower the rate of voltage increase in these thyristors.

A diode 32 has its anode connected to the cathode of the thyristor 23 and the cathode of this diode is connected to the control electrode of said thyristor 23 to limit the value of the reverse voltage which may be applied to the control junction of the thyristor 23. Similar diodes are connected in the same manner to the thyristors 24, 25, 26, 27, 28.

The rectifier bridge 2 serves to control the voltage amplitude at the stator winding of the motor 8. The rectifier bridge 2 is controlled by the phase-control circuit 14. The circuit 14 is synchronized by the voltage from the power supply 1 through transformers 33 and has, at its output, six separate channels to control the six thyristors 23, 24, 25, 26, 27, 28 of the bridge of the rectifier 2. The control circuit 14 uses a vertical control principle which is based on a comparison of the reference sinusoidal voltage of the mains with a control signal from the amplifier 12, as well as on shaping control pulses shaped at the moment when these signals become equal in magnitude. Changing of the output signal from the source 10 brings about a phase shift of the moment of coincidence of said signals and leads to a corresponding shift of the moment when the control pulses are shaped, which causes changing of the voltage at the output of the rectifier bridge 2.

The three-phase bridge independent inverter 5 uses three single-phase circuits 34, 35, 36 connected in parallel between the lead 6, which is connected to the positive plate of the capacitor 4, and the lead 7 which is connected to the negative plate of the capacitor 4. The output terminals 37, 38, 39 of the independent inverter 5 are connected to the stator winding of the motor 8 through current transformers 40, 41, 42.

The single-phase circuits 34, 35, 36 are similar; therefore, for the sake of simplicity, only one circuit 34 is shown in detail. The circuit 34 includes shut-off diodes 43, 44; basic thyristors 45, 46; saturation chokes 47, 48; switching chokes 49, 50; switching capacitors 51, 52; diodes 53, 54 which conduct the current of the motor 8 in the opposite direction; resistors 55, 56; protective RC-circuits with capacitors 57, 58 and resistors 59, 60; diodes 61, 62, resistors 63, 64.

In order to increase the commutating capacity of the independent inverter 5 in the range of low voltages, the capacitors 51, 52 are charged through a resistor 65 by a diode rectifier 66 which is connected to the power supply 1 through a transformer 67. A more detail description of the design and operation of the independent inverter can be found in R. L. Risberg's U.S. Pat. No. 3,344,326, Sept. 26, 1967.

The independent inverter 5 serves to regulate the frequency of the voltage across the stator winding of the motor 8. The independent inverter 5 is controlled by the frequency regulator 11 which includes a frequency setting generator 68 and a counter ring made up of thyristors 69 and transformers 70. The output pulses are taken from the transformers 70 to the main thyristors 45, 46 of the independent inverter 5 in such a sequence that a three-phase a.c. voltage is produced at its output. A more detailed description of the design and operation of the counter ring can be found in the above-mentioned U.S. Pat. No. 3,344,326.

The voltage frequency at the output of the independent inverter 5 is changed by the frequency setting generator 68. The latter includes two emitter followers built around transistors 71, 72, a Royer generator built around transistors 73, 74, a transformer 75, an amplifier using trasistors 76, 77 and a transformer 78. The output pulses of the frequency setting generator 68 are taken to a resistor 79 which serves as an input resistor of the counter ring.

The control circuits are energized by the power supply unit 13 which is connected to the power supply 1.

The electric drive control system realizes the law of constant voltage/frequency ratio and compensates the voltage drop across the resistor of the stator winding of the motor 8.

A signal which is proportional to the voltage, with compensation of the voltage drop across the resistor of the stator winding, is shaped with the aid of the current transformers 40, 41, 42, potentiometers 80, 81, 82, a voltage transformer 83 and rectified by a diode rectifier 84, then taken through an LC-filter using a choke 85 and a capacitor 86 to a potentiometer 87, where it is used as a signal of the first voltage negative feedback circuit.

The reference voltage from a resistor 88 and a potentiometer 89 is applied via a resistor 90 and a lead 91 to the input of the emitter follower with the transistor 71 and a resistor 92, thus unambiguously determining the output frequency of the setting generator 68 and the voltage frequency at the output of the independent inverter 5. At the same time, the reference voltage is applied via the lead 91 to the potentiometer 87 and via a lead 93 to the input of the operational amplifier 12.

Thus, the resistors 88, 89 and 87 compare the reference voltage with the voltage of the first negative feedback circuit. The resulting voltage difference is applied via leads 93, 94 to the input of the amplifier 12 where it is amplified, then applied via leads, 95, 96 to the input of the phase control circuit 14 of the rectifier 2 which maintains a preset voltage/frequency ratio at the ouput of the independent inverter 5.

A potentiometer 97 sets current limiting value in the power circuit of the frequency changer. A signal taken from the resistor 29 is compared with a signal taken from the potentiometer 97. The difference between these two signals is transmitted through leads 98, 99 to the second input of the operational amplifier 12 which limits, through the phase control circuit 14, the output current of the rectifier bridge 2 at a preset level.

The herein proposed improvement resides in the following. The diode 53 and 54 of the single-phase circuits 34, 35, 36 form the bank 20 of valve-action elements of the inverter 5. The anodes of the diodes 54 are connected through the resistors 56 to a common terminal 100. A low-resistance resistor 101 is connected between the terminal 100 and the lead 7. The terminal 100 is also connected to the lead 7 through a series circuit including a capacitor 102 and the primary winding of a differentiating transformer 104. The resistor 101, capacitor 102 and a transformer 104 make up the sensor 19 of the reactive current of the motor 8.

A secondary winding 105 of the transformer 104 is connected to the input terminals of a single-phase full-wave rectifier using diodes 106, 107, 108, 109. The cathodes of the diodes 106, 108 are connected to one another and, through a series circuit including a choke 110, a capacitor 111, and a potentiometer 112, to the anodes of the diodes 107, 109.

Connected between the common cathodes of the diodes 106, 108 and the common anodes of the diodes 107, 109 is a resistor 113, and a capacitor 114 is connected between the common terminal of the choke 110 and the capacitor 111, on the one hand, and the common anodes of the diodes 107, 109, on the other.

The rectifier built around the diodes 106, 107, 108, 109 the resistor 113, the choke 110, the capacitors 114, 111 and the potentiometer 112 form the differentiating unit 21.

The common terminal of the capacitor 111 and the potentiometer 112 is connected via leads 115 and 93 to the slider of the potentiometer 89, and the slider of the potentiometer 112 is connected via a lead 116 to the base of the transistor 71.

A voltage which is proportional to the reactive current of the motor 8 is derived from the secondary winding 105 of the transformer 104. This voltage is applied through a rectifier made up of the diodes 106, 107, 108, 109 to the LC-filter made up of the choke 110 and the capacitor 114. The capacitor 114 puts out a voltage which is proportional to the low-frequency component of the reactive current of the motor 8. This voltage is then differentiated by means of the capacitor 111 and potentiometer 112 and applied to the resistor 90. Thus, a voltage is derived at the resistor 90, which is proportional to first derivative of the low-frequency component of the reactive current of the motor 8. The thus derived voltage is used as the second feedback voltage and, being added to the reference voltage from the resistor 88 and the potentiometer 89, it is applied to the input of the frequency setting generator 68, thus additionally changing the output voltage frequency of the inverter 5.

Under steady-state conditions of operation, a pulsing direct current flows through the resistor 101 at the output of the bank of the valve-action elements 54 and 53, producing no signal proportional to the low-frequency component of the reactive current at the output of the differentiating unit 21, and the frequency of the inverter 5 is determined by the reference voltage taken from the resistor 88 and the potentiometer 89.

When self-oscillations occur, the current through the diodes 53, 54 is changed at a respective frequency, which brings about fluctuations of the input voltage of the inverter 5 and the speed of the motor 8. The frequency of the inverter 5 remaining unchanged, the motor 8 starts operating as a generator for a short period of time, reversing the sign of the torque, which intensively decelerates the motor. Under these conditions the voltage across the storage capacitor 4 increases due to accumulation of the reactive power of the motor 8. Further, due to an increased amount of slip, the current and torque of the induction motor 8 increase too, and the motor starts to gain rpm.

The application of an additional signal from the resistor 90, proportional to the first derivative of the low-frequency component of the motor reactive current (power), to the frequency control circuit, automatically stops self-oscillations by switching the motor over from generating to driving mode of operation. Since the additional signal is determined by a reactive current derivative, it does not affect the stable frequency and, accordingly, the speed of the induction motor; this signal only stabilizes these parameters.

The maximum value of the additional signal constitutes a few percents of the maximum control voltage and is practically determined by the slip frequency of the motor.

The invention may advantageously be used to stabilize the operation of an independent inverter, also when it operates from an unstabilized d.c. source, such as a storage battery, connected to the terminals of the independent inverter.

We claim:

1. A method of eliminating self-oscillations of an induction motor powered from a thyristor frequency changer, in order to control the output voltage and the output frequency of the motor by respective first and second means, the method consisting in applying an additional correcting signal from the frequency changer to said first means, as a positive feedback, said additional signal being proportional to a first derivative of the low-frequency component of the reactive current oscillations of the motor, in sequence with a main control signal applied thereto, the maximum value of changes in the output frequency from said additional signal being limited to a level that is proportional to the nominal frequency of the rotor current of the motor.

2. A control system comprising a power supply and a power circuit which is energized by said power supply to produce an a.c. output voltage, the amplitude and frequency whereof are regulated proportionally, and a control circuit which is energized by said power supply to control said power circuit, which latter includes: (a) a controlled d.c. supply circuit to provide a controlled d.c. voltage; (b) an inverter incorporated in said power circuit and energized through an LC-filter, including a capacitor, by said controlled d.c. voltage to produce an output voltage to feed an a.c. motor; said output voltage having a controlled amplitude which is proportional to said d.c. voltage and the regulated frequency; (c) a bank of valve-action elements of said inverter, which conduct the current of said motor in the opposite direction in order to maintain a voltage across said capacitor that is proportional to the counter-electromotive force of said motor; (d) means incorporated in said control circuit, including a controlled reference voltage circuit to produce a reference voltage, a first feedback circuit to produce a first feedback voltage proportional to said output voltage of the inverter, and a comparison circuit to obtain a deviation voltage proportional to the difference between said reference voltage and said first feedback voltage; (e) means incorporated in said control circuit, sensitive to said deviation voltage, for controlling said d.c. power circuit; (f) frequency controlling means incorporated in said control circuit to control said inverter; said controlled reference voltage circuit being associated with said controlling means to produce a reference voltage which determines the output frequency of said inverter under steady-state conditions; (g) the improvement in the control system residing in a second feedback circuit to produce a second feedback voltage proportional to the low-frequency component of the reactive current oscillations of said motor; (h) a frequency regulator energized by said reference voltage and said second feedback voltage, to provide periodic voltage pulses at a frequency proportional to the sum of said voltages; and (i) means sensitive to said voltage pulses, for controlling said inverter.

3. The control system as defined in claim 2, wherein said second feedback circuit includes: (j) first means for obtaining a voltage proportional to the reactive component of said motor current, said first means being energized by said bank of valve-action elements; (k) second means for obtaining a voltage proportional to said low-frequency component of said reactive current oscillations; said first means feeding said second means; and (1) means for differentiating said last-named proportional voltage.

4. The control system as defined in claim 3, wherein (m) said first means includes a resistor connected between common anodes of said bank of valve-action elements and a negative bus of said d.c. supply circuit, a capacitor, one of the plates whereof is connected to said common anodes, while the other plate is connected in series with a primary winding of a differentiating transformer, the free end whereof is connected to said negative bus; and (n) said second means includes a single-phase full-wave rectifier circuit made up of non-controlled valve-action elements, the input whereof is connected to a secondary winding of said differentiating transformer, a capacitance-resistance differentiating circuit, whose input is connected through a low-frequency LC-filter to the output of said rectifier circuit, and the output of said differentiating circuit is connected in series with the output of said reference voltage circuit, which determines the output frequency of said inverter under steady-state conditions.

* * * * *